(12) United States Patent
Shirakawa et al.

(10) Patent No.: US 7,882,925 B2
(45) Date of Patent: Feb. 8, 2011

(54) VEHICLE STEERING APPARATUS

(75) Inventors: Kunio Shirakawa, Wako (JP); Shunsuke Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/029,024

(22) Filed: Feb. 11, 2008

(65) Prior Publication Data
US 2008/0190687 A1 Aug. 14, 2008

(30) Foreign Application Priority Data
Feb. 13, 2007 (JP) .............................. 2007-031754

(51) Int. Cl.
*B62D 5/04* (2006.01)
(52) U.S. Cl. ...................... 180/446; 280/442; 280/443; 280/445; 701/41
(58) Field of Classification Search .................. 180/402, 180/403, 443, 444, 446
See application file for complete search history.

(56) References Cited
U.S. PATENT DOCUMENTS
2006/0086561 A1* 4/2006 Hidaka ....................... 180/446

2006/0234537 A1* 10/2006 Sugitani ...................... 439/164

FOREIGN PATENT DOCUMENTS
JP 2005-029015 A 2/2005

* cited by examiner

*Primary Examiner*—Lesley Morris
*Assistant Examiner*—Jacob Knutson
(74) *Attorney, Agent, or Firm*—Arent Fox LLP

(57) ABSTRACT

A vehicle steering apparatus utilizing SBW capable of downsizing an expensive turning-power motor, in which a steering mechanism 20 provided with a steering wheel 21 maneuvered by a driver is mechanically separated from a turning mechanism 30 for turning road wheels 35, 35. A turning-power motor 45 of the turning mechanism 30 turns the road wheels 35, 35 based on a turning angle-steering angle ratio determined by a control portion 66 of a controller 61 in accordance with a vehicle speed of the vehicle. The turning angle-steering angle ratio increases with increasing vehicle speed until the vehicle speed reaches a predetermined value from zero; while when the vehicle speed is higher than the predetermined value, the turning angle-steering angle ratio decreases with increasing vehicle speed.

7 Claims, 2 Drawing Sheets

VEHICLE STEERING APPARATUS

This application is based on and claims the benefit of priority from Japanese Patent Application No. 2007-031754, filed on 13 Feb. 2007, the content of which is incorporated herein by reference.

BACKGROUND OF THE INVENTION

1. Field of the Invention

The present invention relates to an improvement of a vehicle steering apparatus utilizing steer-by-wire technology.

2. Related Art

As a typical steering apparatus for vehicles, conventionally, there has been known a steering apparatus which turns wheels through a turning mechanism coupled to a steering wheel by a steering effort of the steering wheel.

Further, there has been recently known a vehicle steering apparatus utilizing steer-by-wire (hereinafter referred to as "SBW") that mechanically separates a turning mechanism from a steering wheel, makes a turning actuator (a turning-power motor) generate turning power in accordance with a steering amount and that transmits the turning power to the turning mechanism to wheels.

According to a steering device for vehicles proposed in Japanese Unexamined Patent Application Publication No. 2005-29016, controlling a turning-power motor by a controller permits automatic setting of the characteristics of the angle ratio of the turning angle of a wheel to the steering amount (the steering angle) of the steering wheel, that is, the steering characteristics (turning angle-steering angle ratio).

FIG. 4 is a view illustrating the relationship between vehicle speeds and turning angle-steering angle ratio in a conventional vehicle steering apparatus utilizing SBW. As illustrated in FIG. 4, the turning angle-steering angle ratio is the highest when the vehicle speed is zero and decreases as the vehicle speed increases. This increases the turning angle of a wheel relative to a steering angle of a steering wheel at low speeds, thus improving tight cornering, and decreases the turning angle of a wheel relative to the steering angle of the steering wheel at high speeds, thus improving vehicle stability.

However, in performing steering at a vehicle speed of zero, that is, stationary steering during stopping, a road wheel is turned without being rotated, accordingly, the maximum turning power is required for road wheel turn. In a conventional vehicle steering apparatus utilizing SBW providing the maximum turning angle-steering angle ratio at a vehicle speed of zero, the turning angle of the road wheel relative to the steering angle of the steering wheel becomes maximum at a vehicle speed of zero, therefore, the turning-power motor requires the highest speed to turn the road wheel. Accordingly, ensuring the turning power necessary for stationary steering unavoidably required an enlargement of the turning-power motor. Because the turning-power motor is expensive, enlargement of the turning-power motor may increase the manufacturing costs of the steering apparatus. Moreover, the turning-power motor must be installed in a small vehicular space, for which size reduction is in demand.

In view of the above-described problems, it is an object of the present invention to provide a technology capable of downsizing the turning-power motor a in a vehicle steering apparatus utilizing SBW.

SUMMARY OF THE INVENTION

A vehicle steering apparatus according to a first aspect of the present invention is a steering mechanism provided with a steering wheel maneuvered by a driver, and a turning mechanism for turning a road wheel, the steering mechanism and the turning mechanism being separated from each other, including a control means (for example, equivalent to a control portion 66 in FIG. 2) for changing a turning angle-steering angle ratio of a turning angle of the road wheel to a steering angle of the steering wheel in accordance with vehicle speed; a turning-power motor (for example, equivalent to a turning power motor 45 in FIG. 1) for turning the road wheel based on the turning angle-steering angle ratio determined by the control means, in which the turning angle-steering angle ratio increases with increasing vehicle speed until a vehicle speed reaches a predetermined value from zero and decreases with increasing vehicle speed when the vehicle speed is larger than the predetermined value.

In a second aspect of the vehicle steering apparatus as described in the first aspect of the present invention, the steering mechanism includes: a reaction motor for generating a steering reaction against the steering wheel; and a reaction transmission mechanism for transmitting the steering reaction of the reaction motor to a steering shaft connected to the steering wheel.

In a third aspect of the vehicle steering apparatus as described in the first aspect of the present invention, the turning mechanism includes: an input shaft to which the turning-power motor inputs a turning power; and a rack shaft connected to the input shaft through a rack and pinion mechanism, each end of the rack shaft being connected to the road wheel; in which the input shaft is connected to a steering shaft through a clutch mechanism, the steering shaft being connected to the steering wheel.

According to the present invention, the turning angle-steering angle ratio changing with vehicle speed increases with increasing vehicle speed until the vehicle speed reaches a predetermined value from zero. Accordingly, the present invention provides lower turning angle-steering angle ratio at a vehicle speed of zero than a conventional vehicle steering apparatus utilizing SBW providing the maximum turning angle-steering angle ratio at a vehicle speed of zero. Specifically, the present invention can eliminate need of requesting the maximum output for the turning-power motor in stationary steering. Accordingly, the present invention enables more downsizing of the turning-power motor than the above-described conventional vehicle steering apparatus. Additionally, the turning angle-steering angle ratio increases with increasing vehicle speed until the vehicle speed reaches a predetermined value from zero and, decreases with increasing vehicle speed when the vehicle speed is larger than the predetermined value. This permits improvement in tight cornering at low vehicle speeds and vehicle stability at high vehicle speeds, which are features of a vehicle steering apparatus utilizing SBW.

The present invention enables downsizing of the turning-power motor while improving tight cornering at low vehicle speeds and vehicle stability at high vehicle speeds. Additionally, downsizing of an expensive turning-power motor provides significant advantages, such as low manufacturing costs and vehicle space savings.

DETAILED DESCRIPTION OF THE INVENTION

One embodiment of the present invention will be more particularly described with reference to the accompanying drawings, in which the components of the present invention may be replaced with other existing components or combined with other existing components as needed. Accordingly, the description of the present invention does not restrict the scope of the invention described in the claims.

Configuration of Vehicle Steering Apparatus

Figure 1:
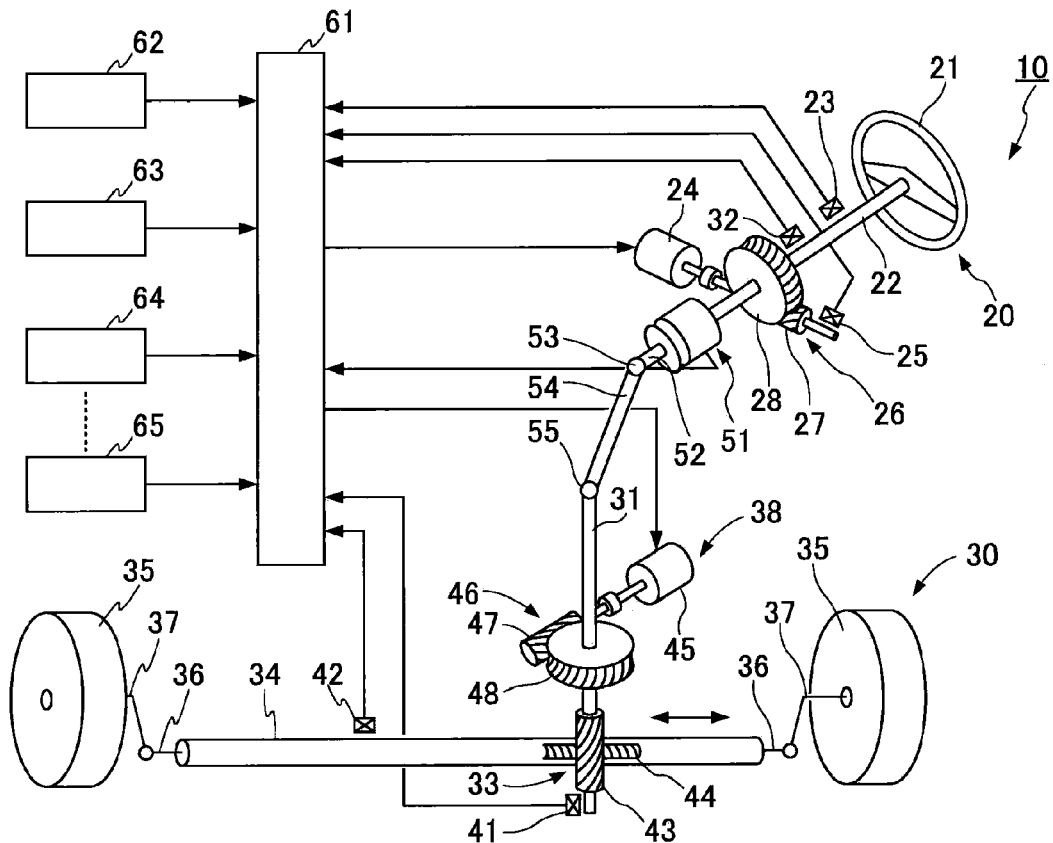
FIG. 1 is a schematic diagram illustrating the configuration of the vehicle steering apparatus according to one embodiment of the present invention.

Referring now to FIG. 1, a description will be given of the configuration of a vehicle steering apparatus 10 according to the present invention. FIG. 1 is a schematic diagram illustrating a configuration of the vehicle steering apparatus 10. The vehicle steering apparatus 10 is a vehicle steering apparatus utilizing a so-called steer-by-wire (SBW) that mechanically separates a turning mechanism 30 from a steering wheel 21, generates turning power from the turning actuator 38 in accordance with a steering amount of the steering wheel 21 and that transmits the turning power to the turning mechanism 30 to turn right and left road wheels 35, 35 by the turning mechanism 30.

A steering mechanism 20 of the vehicle steering apparatus 10 includes: a steering wheel 21 maneuvered by a driver; a steering shaft 22 connected to the steering wheel 21; a steering angle sensor 23 for detecting a steering angle of the steering wheel 21; a reaction motor 24 for generating a steering reaction (reaction torque) against the steering wheel 21; a motor rotational angle sensor 25 for detecting a rotational angle of the reaction motor 24; a reaction torque sensor 32 for detecting a reaction torque working on the steering shaft 22; and a reaction transmission mechanism 26 for transmitting a steering reaction to the steering shaft 22.

The reaction motor 24 is an electric motor and the reaction transmission mechanism 26 is a worm gear mechanism, that is, a servo unit mechanism that includes: a worm 27 mounted on a motor shaft of the reaction motor 24; a worm wheel 28 connected to the steering shaft 22 and engaged with the worm 27. The steering reaction is an operating resistance added to the steering wheel 21 in the rotational direction.

The turning mechanism 30 includes: an input shaft 31 for inputting a steering effort of the steering shaft 22; a rack shaft 34 connected to the input shaft 31 through a rack and pinion mechanism 33; tie rods 36, 36 and knuckles 37, 37 connecting right and left road wheels 35, 35 (for example, front wheels) to both ends of the rack shaft 34; a turning actuator 38 for adding turning power to the input shaft 31; an input shaft rotational angle sensor 41 for detecting a rotational angle of the input shaft 31; and a rack shaft position sensor 42 for detecting a position of the rack shaft 34.

The rack and pinion mechanism 33 has the pinion 43 formed on an input shaft 31 and a rack 44 formed on the rack shaft 34. The turning actuator 38 has a turning-power motor 45 for generating turning power and a turning-power transmission mechanism 46 for transmitting turning power to the input shaft 31. The turning-power motor 45 is an electric motor. The turning-power transmission mechanism 46 is a worm gear mechanism, namely, a servo unit mechanism that includes a worm 47 mounted on a motor shaft of the turning-power motor 45 and a worm wheel 48 connected to the input shaft 31 and engaged with the worm 47.

The vehicle steering apparatus 10 is so called "an end takeoff steering apparatus" structured so as to take out turning torque from both ends of the rack shaft 34. Further, the vehicle steering apparatus 10 connects the steering shaft 22 installed on the steering wheel 21 and the input shaft 31 installed on turning mechanism 30 through a clutch mechanism 51. Specifically, the steering shaft 22 is connected to the input shaft 31 through the clutch mechanism 51, a first connecting shaft 52, a first universal coupling 53, a second connecting shaft 54 and a second universal coupling 55.

A controller 61 receives detection signals from each of the steering angle sensor 23, the motor rotational angle sensor 25, the reaction torque sensor 32, the input shaft rotational angle sensor 41, the rack shaft position sensor 42 and a connection detecting sensor attached inside the clutch mechanism 51. Additionally, the controller 61 receives detection signals from each of a vehicle speed sensor 62 for detecting a vehicle running speed, a yaw rate sensor 63 for detecting a yaw angle speed (angular speed of yaw movement), an acceleration sensor 64 for detecting a vehicle acceleration and other various types of sensors 65 and outputs control signals to the reaction motor 24, the turning-power motor 45 and the clutch mechanism 51.

The controller 61 can automatically set the characteristic of the angle ratio of the turning angle of the road wheels 35, 35 to the steering angle of the steering wheel 21, that is, the steering characteristics (steering angle ratio), by controlling the turning-power motor 45. In other words, the above-described mechanical separation of the steering wheel 21 from the turning mechanism 30 permits setting of a corresponding relationship between the steering angle of the steering wheel 21 and the operation amount of the turning actuator 38 without being subject to mechanical constraints. This enables flexible setting of steering characteristics in accordance with vehicle speed, thus improving design flexibility for the vehicle steering apparatus 10.

Furthermore, when locking, the controller 61 stops the rotation of the brushless motor described below for controlling rotation of a lock wheel provided inside the clutch mechanism 51, thereby mechanically connecting the steering wheel 21 with the clutch mechanism 51, thus making wheels steerable.

Control Process for Turning-Power Motor

Figure 2:
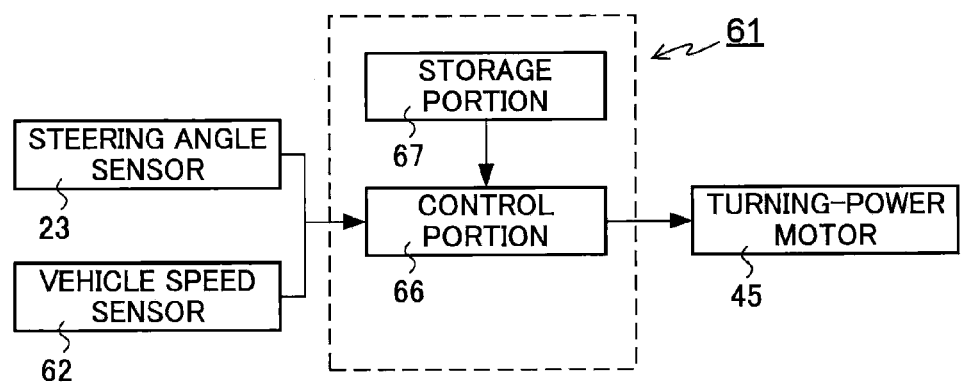
FIG. 2 is a block diagram illustrating a control block for controlling a turning-power motor of a controller according to the embodiment.
Figure 3:
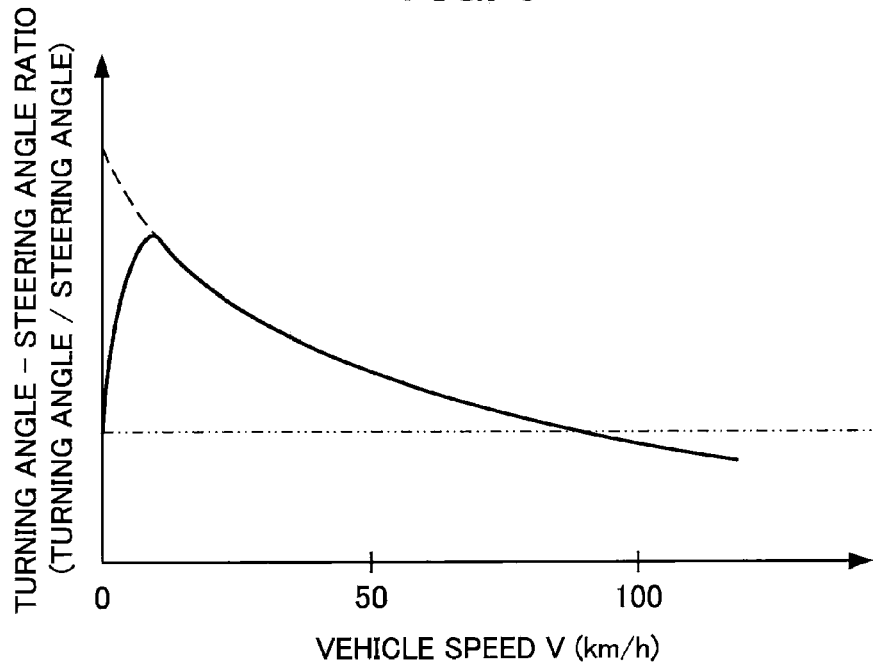
FIG. 3 is a view illustrating a relationship between vehicle speeds and turning angle-steering angle ratio stored in a storage portion according to the embodiment.
Figure 4:
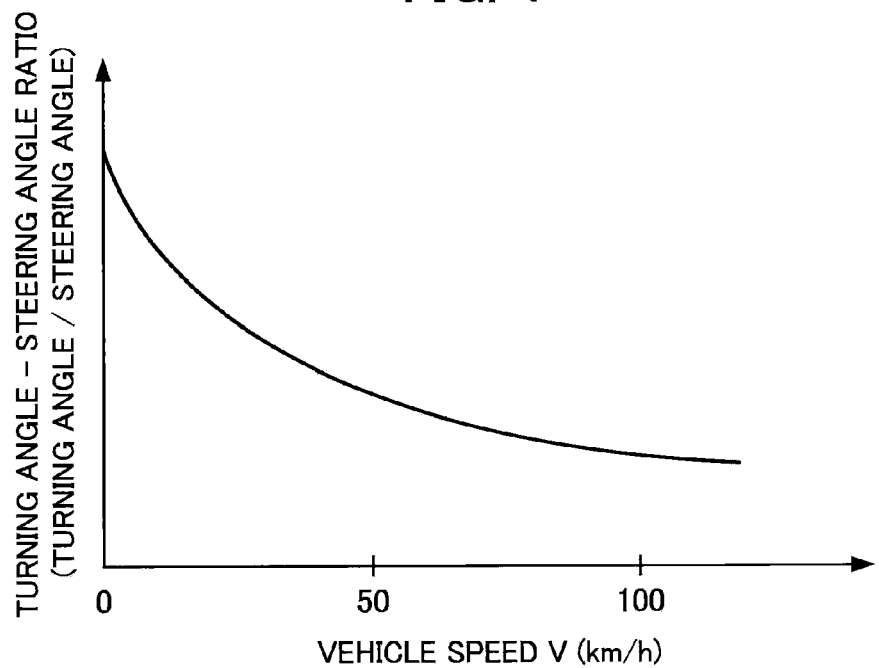
FIG. 4 is a view illustrating the relationship between vehicle speeds and turning angle-steering angle ratio in a conventional vehicle steering apparatus utilizing SBW.

Referring next to FIGS. 2 and 3, a description will be given of the control process for the turning-power motor 45 by the controller 61. FIG. 2 is a block diagram illustrating the control block for controlling the turning-power motor 45 of the controller 61. The control block for controlling the turning power motor 45, as illustrated in FIG. 2, has a control portion 66 and a storage portion 67 serving as a part of the controller 61.

The control portion 66 sets a targeted turning angle using a data map stored in the storage portion 67 with steering angle signals including an operational direction (rotational direction) of the steering wheel 21 from the steering angle sensor 23 and a vehicle speed signal from the vehicle speed sensor 62 as input values and supplies predetermined electric power to the turning-power motor 45. The storage portion 67 stores a data map of vehicle speed vs. turning angle-steering angle ratio for determining the turning angle-steering angle ratio from the vehicle speed.

The turning angle-steering angle ratio refers to the relationship between the steering angle of the steering wheel 21 and the turning angle of each of the road wheels 35, 35 and is indicated with a turning angle/steering angle. In other words, as the turning angle-steering angle ratio is large, the turning angle of the each of road wheels 35, 35 increases relative to the steering angle of the steering wheel 21. On the contrary, as the turning angle-steering angle ratio is small, the turning angle of road wheels 35, 35 decreases relative to the steering angle of the steering wheel 21.

The vehicle steering apparatus utilizing SBW stores such a data map of vehicle speed-steering angle ratio as described above for flexible setting of steering characteristics in accordance with vehicle speed, thus attaining high design flexibility of the vehicle steering apparatus.

FIG. 3 is a view illustrating a data map of vehicle speed vs. turning angle-steering angle ratio stored in the storage portion 67.

The solid line in FIG. 3 indicates the relationship between the vehicle speed and turning angle-steering angle ratio in the present embodiment, while the broken line indicates the relationship between vehicle speeds and turning angle-steering angle ratio in a conventional vehicle steering apparatus utilizing SBW. Moreover, the two-dot chain line in FIG. 3 indicates the usual turning angle-steering angle ratio, for example, in a non-SBW vehicle steering apparatus, that is, such the turning angle-steering angle ratio that the road wheels 35, 35 have the maximum turn when the steering wheel 21 makes approx. 2.7 turns.

In the relationship between vehicle speed and turning angle-steering angle ratio, the turning angle-steering angle ratio at a vehicle speed of zero almost meets the usual turning angle-steering angle ratio in a non-SBW vehicle steering apparatus. Moreover, the turning angle-steering angle ratio increases with increasing vehicle speed until the vehicle speed reaches a predetermined speed. Subsequently, when the vehicle speed reaches the predetermined speed, the turning angle-steering angle ratio meets that in a conventional vehicle steering apparatus utilizing SBW and, when the vehicle speed is higher than the predetermined vehicle speed, the turning angle-steering angle ratio decreases with increasing vehicle speed in the same way as for the conventional vehicle steering apparatus utilizing SBW.

In other words, the vehicle steering apparatus 10 according to the present embodiment restrains the turning angle-steering angle ratio at a vehicle speed of zero more than a conventional SBW vehicle steering apparatus. Accordingly, the vehicle steering apparatus can restrain the turning angle of each of the road wheels 35, 35 relative to the steering angle of the steering wheel 21 during steering at a vehicle speed of zero, that is, stationary steering, so as to restrain the speed of the turning-power motor 45 during stationary steering, thus attaining a size reduction in the turning-power motor 45.

The turning angle-steering angle ratio increases with increasing vehicle speed until vehicle speed reaches a predetermined speed from zero and meets that in a conventional SBW vehicle steering apparatus. Accordingly, increasing the turning angle-steering angle ratio at a low vehicle speed can ensure tight cornering at low vehicle speeds. Particularly, the turning angle-steering angle ratio increases with increasing vehicle speed, thus preventing an uncomfortable feeling from being given to a driver.

When the vehicle speed is higher than a predetermined speed, the turning angle-steering angle ratio decreases with increasing vehicle speed in the same way as for a conventional vehicle steering apparatus utilizing SBW. This permits ensuring vehicle stability at high vehicle speeds.

When the vehicle speed is not zero, the road wheels 35, rotate, so that no steering effort is required for the turning-power motor 45 in the same way as when the vehicle speed is zero. As a result, even if the turning angle-steering angle ratio is increased with increasing vehicle speeds, the speed of the turning-power motor 45 can be restrained, thus downsizing the turning-power motor 45.

Accordingly, the present embodiment enables downsizing of the turning-power motor 45 while ensuring tight cornering at low vehicle speeds. Use of the downsized turning-power motor 45 can ensure space saving for a vehicle.

One embodiment of the present invention has been described above in detail with reference to the accompanying drawings, but the concrete configuration is not limited thereto. The embodiment includes such designs that may be made without departing from the scope of the present invention.

What is claimed is:

1. A vehicle steering apparatus having a steering mechanism provided with a steering wheel maneuvered by a driver and a turning mechanism for turning a road wheel, the steering mechanism and the turning mechanism being mechanically separated from each other, comprising:
   a control means for changing a turning angle-steering angle ratio of a turning angle of the road wheel to a steering angle of the steering wheel in accordance with vehicle speed; and
   a turning-power motor for turning the road wheel based on the turning angle-steering angle ratio determined by the control means,
   wherein the turning angle-steering angle ratio increases with increasing vehicle speed until a vehicle speed reaches a predetermined value from zero and decreases with increasing vehicle speed when the vehicle speed is larger than the predetermined value,
   wherein an average value of absolute values of a rate of change of the turning angle-steering angle ratio when the turning angle-steering angle ratio decreases is smaller than an average value of absolute values of a rate of change of the turning angle-steering angle ratio when the turning angle-steering angle ratio increases, and
   wherein the predetermined value is set to less than 50 km/h.

2. The vehicle steering apparatus according to claim 1, the steering mechanism comprises:
   a reaction motor for generating a steering reaction against the steering wheel; and
   a reaction transmission mechanism for transmitting the steering reaction of the reaction motor to a steering shaft connected to the steering wheel.

3. The vehicle steering apparatus according to claim 1, the turning mechanism comprises:
   an input shaft to which the turning-power motor inputs a turning power; and
   a rack shaft connected to the input shaft through a rack and pinion mechanism, each end of the rack shaft being connected to the road wheel;
   wherein the input shaft is connected to a steering shaft through a clutch mechanism, the steering shaft being connected to the steering wheel.

4. A vehicle steering apparatus having a steering mechanism provided with a steering wheel maneuvered by a driver and a turning mechanism for turning a road wheel, the steering mechanism and the turning mechanism being mechanically separated from each other, comprising:
   a control means for changing a turning angle-steering angle ratio of a turning angle of the road wheel to a steering angle of the steering wheel in accordance with vehicle speed; and
   a turning-power motor for turning the road wheel based on the turning angle-steering angle ratio determined by the control means, wherein the turning angle-steering angle ratio increases for at least a portion of a low speed region, where the vehicle speed is equal to or lower than a predetermined vehicle speed, and decreases for at least a portion of a high speed region, where the vehicle speed is equal to or higher than the predetermined vehicle speed.

5. The vehicle steering apparatus according to claim 4,
wherein the turning angle-steering angle ratio is decreased at a predetermined vehicle speed or lower in a low-speed region, and is decreased in a region of the predetermined vehicle speed or higher, and wherein an average value of absolute values of a rate of change of the turning angle-steering angle ratio when the turning angle-steering angle ratio decreases is smaller than an average value of absolute values of a rate of change of the turning angle-steering angle ratio when the turning angle-steering angle ratio increases.

6. The vehicle steering apparatus according to claim 4, wherein the steering mechanism comprises:

a reaction motor for generating a steering reaction against the steering wheel; and a reaction transmission mechanism for transmitting the steering reaction of the reaction motor to a steering shaft connected to the steering wheel.

7. The vehicle steering apparatus according to claim 4, wherein the turning mechanism comprises:

an input shaft to which the turning-power motor inputs a turning power; and a rack shaft connected to the input shaft through a rack and pinion mechanism, each end of the rack shaft being connected to the road wheel, wherein the input shaft is connected to a steering shaft through a clutch mechanism, the steering shaft being connected to the steering wheel.

\* \* \* \* \*